United States Patent
Choi

(10) Patent No.: US 12,541,686 B2
(45) Date of Patent: Feb. 3, 2026

(54) METHOD AND APPARATUS WITH NEURAL ARCHITECTURE SEARCH BASED ON HARDWARE PERFORMANCE

(71) Applicant: SAMSUNG ELECTRONICS CO., LTD., Suwon-si (KR)

(72) Inventor: Saerom Choi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1078 days.

(21) Appl. No.: 17/153,282

(22) Filed: Jan. 20, 2021

(65) Prior Publication Data

US 2022/0076121 A1 Mar. 10, 2022

(30) Foreign Application Priority Data

Sep. 8, 2020 (KR) .................. 10-2020-0114703

(51) Int. Cl.
  *G06N 3/082* (2023.01)
  *G06F 11/34* (2006.01)
  *G06N 3/04* (2023.01)
  *G06N 3/063* (2023.01)

(52) U.S. Cl.
  CPC ......... *G06N 3/082* (2013.01); *G06F 11/3457* (2013.01); *G06N 3/04* (2013.01); *G06N 3/063* (2013.01)

(58) Field of Classification Search
  CPC .......... G06N 3/082; G06N 3/04; G06N 3/063; G06F 11/3457
  See application file for complete search history.

(56) References Cited

U.S. PATENT DOCUMENTS

| | | | |
|---|---|---|---|
| 10,275,719 B2 | 4/2019 | Talathi et al. | |
| 11,176,449 B1 * | 11/2021 | Nez | ............ G06F 12/0207 |
| 11,645,509 B2 * | 5/2023 | Zhou | ............ G06N 3/04 |
| | | | 706/14 |
| 2016/0217369 A1 * | 7/2016 | Annapureddy | ........ G06N 3/082 |

(Continued)

FOREIGN PATENT DOCUMENTS

| | | |
|---|---|---|
| CA | 3 114 635 | 5/2020 |
| CN | 111401545 A | 7/2020 |
| WO | WO 2020/068437 A1 | 4/2020 |

OTHER PUBLICATIONS

Hinton, Geoffrey, Oriol Vinyals, and Jeff Dean. "Distilling the knowledge in a neural network." arXiv preprint arXiv: 1503.02531 (2015). (Year: 2015).*

(Continued)

*Primary Examiner* — Andrew T Chiusano
(74) *Attorney, Agent, or Firm* — NSIP Law

(57) ABSTRACT

A processor-implemented neural architecture search method includes: acquiring performance of neural network blocks included in a pre-trained neural network; selecting at least one target block for performance improvement from the neural network blocks; training weights and architecture parameters of candidate blocks corresponding to the target block based on arbitrary input data and output data of the target block generated based on the input data; and updating the pre-trained neural network by replacing the target block in the pre-trained neural network with one of the candidate blocks based on the trained architecture parameters.

29 Claims, 6 Drawing Sheets

(56) References Cited

U.S. PATENT DOCUMENTS

| | | | |
|---|---|---|---|
| 2016/0224903 A1 | 8/2016 | Talathi et al. | |
| 2016/0328644 A1* | 11/2016 | Lin | G06N 3/04 |
| 2017/0344881 A1 | 11/2017 | Okuno et al. | |
| 2018/0114110 A1* | 4/2018 | Han | G06N 3/082 |
| 2018/0204115 A1* | 7/2018 | Lee | G06N 3/082 |
| 2018/0336453 A1 | 11/2018 | Merity et al. | |
| 2019/0102678 A1 | 4/2019 | Chang et al. | |
| 2019/0138901 A1* | 5/2019 | Meyer | G06N 3/08 |
| 2019/0286984 A1 | 9/2019 | Vasudevan et al. | |
| 2019/0354837 A1* | 11/2019 | Zhou | G06N 3/044 |
| 2019/0370648 A1 | 12/2019 | Zoph et al. | |
| 2020/0004835 A1 | 1/2020 | Ramanath et al. | |
| 2020/0042864 A1* | 2/2020 | Nguyen | G06N 3/082 |
| 2020/0057941 A1 | 2/2020 | Bello et al. | |
| 2020/0065689 A1 | 2/2020 | Vasudevan et al. | |
| 2020/0073971 A1 | 3/2020 | Elliott | |
| 2020/0082247 A1 | 3/2020 | Wu et al. | |
| 2020/0082275 A1 | 3/2020 | Sun et al. | |
| 2020/0257961 A1* | 8/2020 | Hua | G06N 3/045 |
| 2020/0334520 A1* | 10/2020 | Chen | G06F 40/216 |
| 2021/0019599 A1* | 1/2021 | Mazzawi | G06N 3/047 |
| 2021/0056378 A1* | 2/2021 | Yang | G06F 16/9024 |
| 2021/0073644 A1* | 3/2021 | Lin | G06N 3/082 |
| 2022/0004879 A1* | 1/2022 | Huang | G06N 3/04 |
| 2022/0051077 A1* | 2/2022 | Famouri | G06N 3/082 |
| 2023/0121404 A1* | 4/2023 | Liu | G06N 3/04 |
| | | | 706/25 |

OTHER PUBLICATIONS

Bucilă, Cristian, Rich Caruana, and Alexandru Niculescu-Mizil. "Model compression." Proceedings of the 12th ACM SIGKDD international conference on Knowledge discovery and data mining. 2006. (Year: 2006).*

Xu, Canwen, et al. "Bert-of-theseus: Compressing bert by progressive module replacing." arXiv preprint arXiv:2002.02925 (2020). (Year: 2020).*

Pilipovic, Patricio Bulic Ratko, and Vladimir Risojevic. "Compression of convolutional neural networks." 17th (2018): 21-23. (Year: 2018).*

Cheng, Yu, et al. "A survey of model compression and acceleration for deep neural networks." arXiv preprint arXiv: 1710.09282 (2017). (Year: 2017).*

Wu, Bichen, et al. "Fbnet: Hardware-aware efficient convnet design via differentiable neural architecture search." Proceedings of the IEEE/CVF conference on computer vision and pattern recognition. 2019. (Year: 2019).*

Hsu, Chi-Hung, et al. "Monas: Multi-objective neural architecture search using reinforcement learning." arXiv preprint arXiv:1806.10332 (2018). (Year: 2018).*

Extended European Search report issued on May 9, 2022, in counterpart European Patent Application No. 21184767.8 (10 pages in English).

Li, Changlin, et al. "Block-wisely Supervised Neural Architecture Search with Knowledge Distillation." *Proceedings of the IEEE/CVF Conference on Computer Vision and Pattern Recognition*. 2020 (10 pages in English).

Xu, Yuhui, et al. "Latency-Aware Differentiable Neural Architecture Search." *arXiv preprint arXiv:2001.06392* (2020) (19 pages in English).

Guo, Yong, et al. "Nat: Neural architecture transformer for accurate and compact architectures." *Advances in Neural Information Processing Systems*. 2019 (12 pages in English).

Cal, Han, Ligeng Zhu, and Song Han. "Proxylessnas: Direct neural architecture search on target task and hardware." *arXiv preprint arXiv:1812.00332* (2018) (13 pages in English).

Lu, Qing, et al., "On Neural Architecture Search for Resource-Constrained Hardware Platforms", arXiv:1911.00105v1, Oct. 31, 2019, (8 Pages in English).

Ge, Dao-Hui, et al., "Survey of Lightweight Neural Network", Journal of Software, vol. 31, No. 9, Sep. 2020, http://www.jos.org.cn/1000-9825/5942.htm (pp. 2627-2653).

Chinese Office Action Issued on Aug. 23, 2025, in Counterpart Chinese Patent Application No. 202110230981.9 (14 Pages in English, 10 Pages in Chinese).

* cited by examiner

METHOD AND APPARATUS WITH NEURAL ARCHITECTURE SEARCH BASED ON HARDWARE PERFORMANCE

CROSS-REFERENCE TO RELATED APPLICATIONS

This application claims the benefit under 35 USC § 119(a) of Korean Patent Application No. 10-2020-0114703, filed on Sep. 8, 2020, in the Korean Intellectual Property Office, the entire disclosure of which is incorporated herein by reference for all purposes.

BACKGROUND

1. Field

The following description relates to a method and apparatus with a neural architecture search based on a hardware performance.

2. Description of Related Art

A neural architecture search (NAS) may be a technique for automatically searching for a structure of a neural network, that is, an architecture. The NAS may optimize the neural network with a high recognition rate in various fields such as image classification and speech recognition to have a structure suitable for hardware. The NAS may design an optimal architecture through learning. The NAS technique may include a method of training an RNN controller that predicts values of elements determining an architecture of a neural network based on reinforcement learning, a method of searching for a new neural network structure using a knowledge distillation scheme, and a method of searching for a structure to replace an unnecessary operation. Such methods may require operations for searching and learning a new architecture. The NAS may require a lot of computing resources and time for computation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural architecture search method includes: acquiring performance of neural network blocks included in a pre-trained neural network;
selecting at least one target block for performance improvement from the neural network blocks; training weights and architecture parameters of candidate blocks corresponding to the target block based on arbitrary input data and output data of the target block generated based on the input data; and updating the pre-trained neural network by replacing the target block in the pre-trained neural network with one of the candidate blocks based on the trained architecture parameters.

The training may include, for each of the corresponding candidate blocks: generating a loss function based on a degree of matching between output data of the corresponding candidate block and the output data of the target block and performance of the corresponding candidate block, wherein the output data of the corresponding candidate block and the output data of the target block are generated based on the same input data; and training a weight and an architecture parameter of the corresponding candidate block based on the loss function.

The training may include, for each of the corresponding candidate blocks: determining whether the corresponding candidate block is a target to be trained based on an architecture parameter of the corresponding candidate block; and training the corresponding candidate block in response to the corresponding candidate block being determined as the target to be trained.

The determining may include determining the corresponding candidate block is the target to be trained in response to the architecture parameter of the corresponding candidate block being greater than or equal to a predetermined threshold.

The acquiring of the performance of the neural network blocks may include: determining the performance of the neural network blocks based on measurement values of performance in actual hardware of operations of the neural network blocks.

The acquiring of the performance of the neural network blocks may include: estimating the performance of the neural network blocks based on a prediction model in which performance in hardware of operations of the neural network blocks is learned.

The acquiring of the performance of the neural network blocks may include: estimating the performance of the neural network blocks based on a simulation of performance in hardware of operations of the neural network blocks.

The selecting of the target block may include either one or both of: selecting at least one of the neural network blocks as the target block in an ascending order of the performance of the neural network blocks; and comparing the performance of the neural network blocks to a threshold and selecting at least one of the neural network blocks having performance lower than the threshold as the target block.

The training may include: generating the input data and generating the output data by inputting the input data to the target block as training data; training at least one of the candidate blocks based on the training data; and removing the training data in response to completion of the training performed based on the training data.

The training may include: acquiring, as the candidate blocks, candidate blocks having an input dimension and an output dimension which are the same as that of the target block.

The replacing of the target block may include: selecting one of the candidate blocks having a greatest architecture parameter from the candidate blocks; and replacing the target block with the selected candidate block.

The selecting of the target block further may include: selecting the target block from the neural network blocks based on a hardware restriction condition.

The training may include, for each of the corresponding candidate blocks: generating a loss function based on a degree of matching between output data of the corresponding candidate block and the output data of the target block, performance of the corresponding candidate block, and the hardware restriction condition, wherein the output data of the corresponding candidate block and the output data of the target block are generated based on the same input data; and training a weight and an architecture parameter of the corresponding candidate block based on the loss function.

The hardware restriction condition may correspond to a neural network operation type and a neural network size supported by hardware configured to implement the neural network.

The selecting of the target block based on the hardware restriction condition may include selecting the target block in response to the target block not satisfying the hardware restriction condition.

Each of the neural network blocks may include at least one layer of the pre-trained neural network.

Each of the candidate blocks may include at least one layer in which a predetermined operation of the trained neural network is performed and have an input dimension and an output dimension which are the same as that of the target block.

The performance may be determined based any one or any combination of an execution speed of the neural network blocks in hardware, a number of calculations performed by the neural network blocks, and a size of the neural network.

A non-transitory computer-readable storage medium may store instructions that, when executed by one or more processors, configure the one or more processors to perform the method.

In another general aspect, a neural architecture search apparatus includes: one or more processors configured to: acquire performance of neural network blocks included in a pre-trained neural network; select at least one target block for performance improvement from the neural network blocks; train weights and architecture parameters of candidate blocks corresponding to the target block based on arbitrary input data and output data of the target block generated based on the input data; and update the pre-trained neural network by replacing the target block in the pre-trained neural network with one of the candidate blocks based on the trained architecture parameters.

For the training, the one or more processors may be configured to, for each of the candidate blocks: generate a loss function based on a degree of matching between output data of the corresponding candidate block and the output data of the target block and performance of the corresponding candidate block, wherein the output data of the corresponding candidate block and the output data of the target block are generated based on the same input data; and
  train a weight and an architecture parameter of the corresponding candidate block based on the loss function.

For the training, the one or more processors may be configured to, for each of the corresponding candidate blocks: determine whether the corresponding candidate block is a target to be trained based on an architecture parameter of the corresponding candidate block; and train the corresponding candidate block in response to the corresponding candidate block being determined as the target to be trained.

For the training, the one or more processors may be configured to: generate, as training data, the input data and the output data of the target block; train at least one of the candidate blocks based on the training data; and remove the training data in response to completion of the training performed based on the training data.

For the acquiring of the performance of the neural network blocks, the one or more processors may be configured to perform any one or any combination of: determining the performance of the neural network blocks based on measurement values of performance in actual hardware of operations of the neural network blocks; estimating the performance of the neural network blocks based on a prediction model in which the performance in the hardware of the operations of the neural network blocks is learned; and estimating the performance of the neural network blocks based on a simulation of the performance in the hardware of the operations of the neural network blocks.

For the training, the one or more processors may be configured to acquire, as the candidate blocks, candidate blocks having an input dimension and an output dimension which are the same as that of the target block.

For the selecting of the target block, the one or more processors may be configured to select the target block from the neural network blocks based on a hardware restriction condition.

For the training, the one or more processors may be configured to, for each of the corresponding candidate blocks: generate a loss function based on a degree of matching between output data of the corresponding candidate block and the output data of the target block, performance of the corresponding candidate block, and the hardware restriction condition, wherein the output data of the corresponding candidate block and the output data of the target block are generated based on the same input data; and train a weight and an architecture parameter of the corresponding candidate block based on the loss function.

In another general aspect, a processor-implemented neural architecture search method includes: selecting a target block from neural network blocks included in a pre-trained neural network, based on performance of the neural network blocks; selecting candidate blocks based on architecture parameters of the candidate blocks; training the architecture parameters of the selected candidate blocks based on arbitrary input data and output data generated by inputting the input data to the target block; and updating the pre-trained neural network by replacing the target block in the pre-trained neural network with one of the candidate blocks selected based on the trained architecture parameters.

Data used to train the pre-trained neural network may not include the arbitrary input data and the output data of the target block.

Other features and aspects will be apparent from the following detailed description, the drawings, and the claims.

Figure 1:
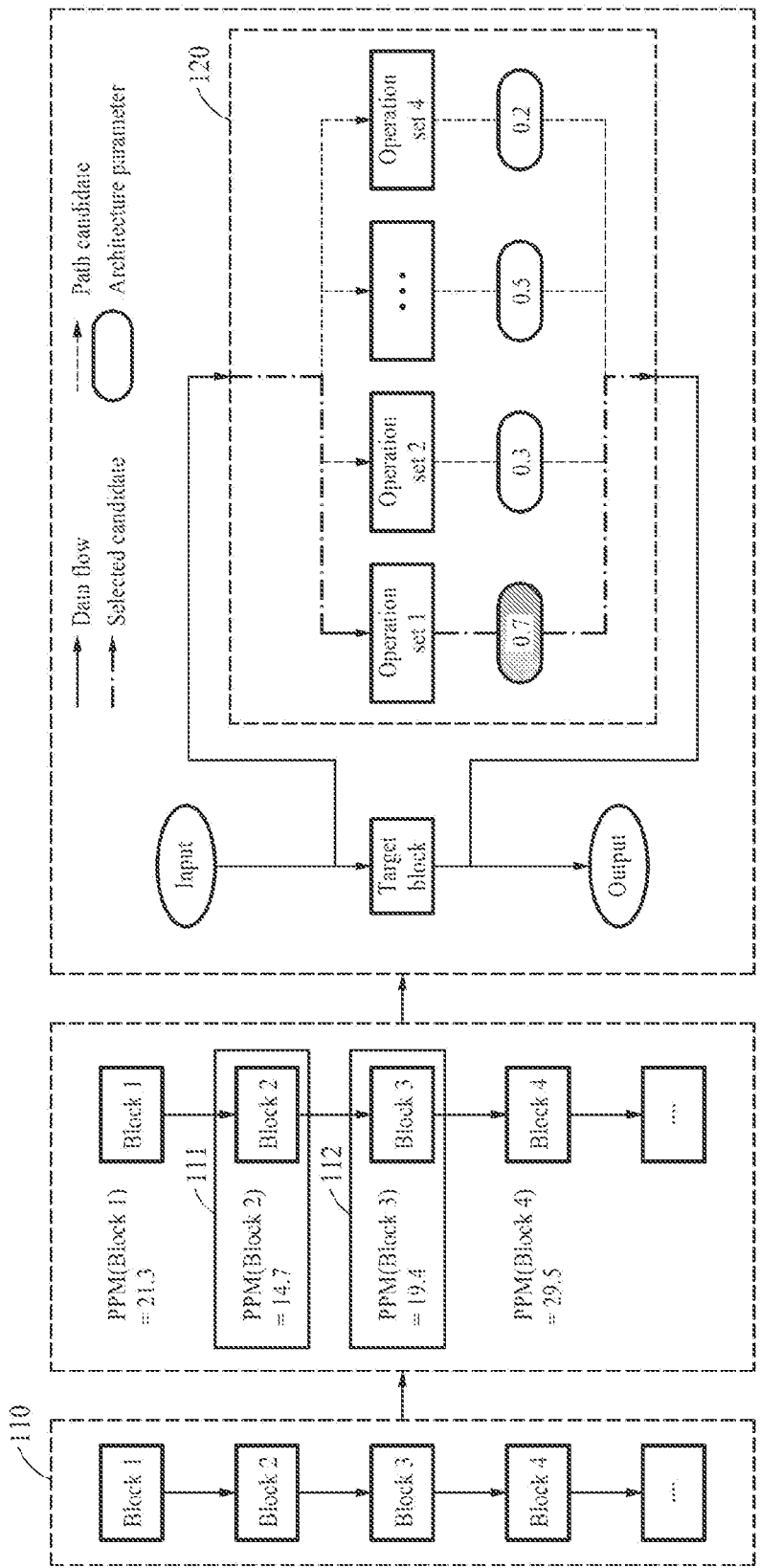
FIG. 1 illustrates an example of a neural architecture search method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting of the present disclosure. As used herein, the singular forms "a," "an," and "the," are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

A component having a common function with a component included in one example embodiment is described using a like name in another example embodiment. Unless otherwise described, a description made in one example embodiment may be applicable to another example embodiment and a detailed description within a duplicate range is omitted.

FIG. 1 illustrates an example of a neural architecture search method.

An neural architecture search (NAS) technique for searching for an optimal neural network of one or more embodiments may reduce an amount of resources used for computation while securing a high accuracy. Referring to FIG. 1, a neural architecture search method may include an operation of acquiring (e.g., determining) performance (PPM (Block n, n=1, 2, 3, 4)) of neural network blocks (Block n) included in a pre-trained neural network 110, an operation of selecting at least one target block 111, 112 for performance improvement from among the blocks, an operation of training weights and architecture parameters of candidate blocks 120 corresponding to the selected at least one target block based on arbitrary input data and output data of the target block generated in response to the input data (e.g., output data generated by inputting the input data into the target block), and an operation of replacing the target block with one of the candidate blocks based on the trained architecture parameters. The neural architecture search method may be performed in a server or an apparatus and performed by a processor (e.g., one or more processors) included in the server or the apparatus.

The pre-trained neural network 110 may include various neural networks such as a recurrent neural network (RNN) and/or a convolutional neural network (CNN), and a combination of neural networks. The pre-trained neural network 110 may be a neural network that has been trained and may include at least one layer in which a parameter(s) is determined. Hereinafter, the neural network may be simply referred to as a "network."

A block is a portion or segment of a neural network structure and may include at least one layer in the pre-trained neural network 110. For example, the block may correspond to a portion or segment of a neural network structure including one or more layers performing one or more operations used in a neural network such as convolution, rectified linear unit (ReLU), and the like. In other words, the neural network may be divided into a plurality of blocks. For example, the neural network structure may be divided into a plurality of blocks including one or more layers according to a function performed by a layer included in the neural network.

Performance of the block may be determined based on a speed of execution of the block in hardware, a number of calculations performed in the block, a required amount of memory, a size of the neural network including the block, and/or the block's contribution to accuracy in the entire network. The performance of the block may be evaluated in accordance with the purpose of the neural network. For example, when an execution speed of the neural network is to be improved, the performance of blocks may be evaluated based on the execution speed of the blocks included in the neural network. The performance of the block may be a criterion for selecting a block for performance improvement or a target block to be optimized. The selected target block may be replaced with a block performing another operation. The performance of the block may be acquired in a form to be compared to performance of another block. For example, referring to FIG. 1, the performance (PPM) of the blocks may be acquired as numerical values to be compared to other blocks.

The performance of the block may be measured based on a measurement value of performance in actual hardware of operations performed in the block. In other words, an operation of acquiring performance of blocks may include an operation of measuring performance of the blocks based on measurement values of performance in actual hardware of operations performed in the blocks included in the pre-trained neural network. The measurement value of the performance in actual hardware of the operation(s) performed in the block may be acquired from a database in which performance of each operation measured when the network actually performs the operation in the hardware is recoded.

The performance of the block may be estimated based on a prediction model having learned the performance in the hardware of the operations performed in the block. In other words, an operation of acquiring the performance of the blocks may include an operation of estimating performance of the blocks based on a prediction model having learned performance in hardware of operations performed in the blocks included in the pre-trained neural network. For example, the prediction model may correspond to a model in which the performance in the hardware of the operations performed in the neural network is learned by deep learning. A processor that acquires the performance of the blocks included in the pre-trained neural network may input each of the blocks to the prediction model and acquire a value of estimated performance in the hardware of operations performed in each block.

The performance of the block may be estimated based on a simulation of the performance in the hardware of the operations performed in the block. In other words, an operation of acquiring the performance of the blocks may include an operation of estimating performance of the blocks based on the simulation of the performance in the hardware of the operations performed in the blocks included in the pre-trained neural network. For example, a number of operations performed in the block or performance related to a required memory amount may be calculated using a simple equation. Also, a sum of performance of each operation performed in the hardware may be estimated as performance of the network.

Based on the acquired performance of the blocks, at least one block for performance improvement may be selected from the blocks included in the neural network as a target block. An operation of selecting the target block may include at least one of an operation of selecting at least one block as the target block in an ascending order of the performance of the blocks and an operation of comparing the performance of the blocks to a threshold and selecting at least one block having performance lower than the threshold as the target value. For example, referring to FIG. 1, the blocks 111 and 112 corresponding to two blocks having the lowest performance or corresponding to a predetermined low percent may be selected as target blocks. Also, among the blocks, the blocks 111 and 112 having performance less than or equal to (or below) a threshold "20" may be selected as the target block.

The operation of acquiring the performance of the blocks included in the pre-trained neural network and the operation of selecting at least one target block requiring the performance improvement from the blocks may be performed in a performance prediction module.

Figure 2:
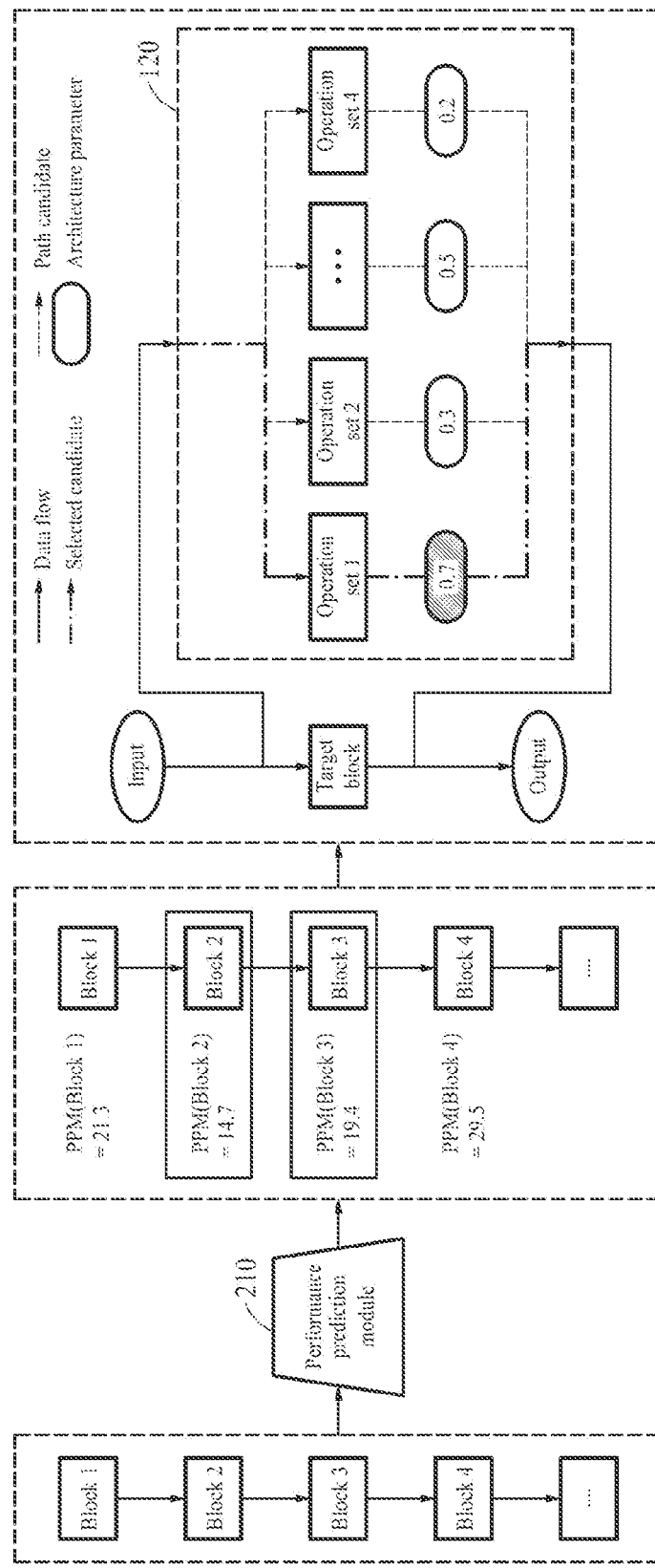
FIG. 2 illustrates an example of a method of acquiring performance of a block using a performance prediction module.

FIG. 2 illustrates an example of a method of acquiring performance of a block using a performance prediction module. Referring to FIG. 2, a performance prediction module 210 may acquire performance of each block by estimating or measuring performance in hardware of operations performed in blocks. For example, to acquire the performance, the performance prediction module 210 may include a lookup table in which measurement values of performance in hardware of operations performed in the neural network, a prediction model in which the performance of the operations is learned by deep learning, and/or a simulator that simulates the performance in the hardware of the operations.

The performance prediction module 210 may select one or more blocks for performance improvement as a target block based on the acquired performance. For example, a block of which performance is less than or equal to a threshold and/or a block of which performance belongs to a predetermined low percent may be selected as the target block.

Referring back to FIG. 1, to replace the target block 111, 112 with a block performing another operation, the neural architecture search method may further include an operation of acquiring the candidate blocks 120 corresponding to each target block. The candidate blocks corresponding to the target block may be included in a neural network structure and may be trained to replace the target block.

At least one layer in which a predetermined operation is performed may be included in each candidate block. The at least one layer may have the same input dimension and output dimension as that of the target block. In other words, the candidate block corresponding to the target block may include an operation set of one or more operations having the same input and output dimensions as that of the target block. Each of the candidate blocks corresponding to the target block may include a configuration of different layers. Also, various operations may be performed in each of the candidate blocks.

The candidate blocks may include a plurality of blocks set by a user to correspond to the target block and include a plurality of blocks automatically determined to correspond to the target block. The candidate blocks may include neural network blocks configured by changing a connection structure of layers in the target block, changing combinations of layers, reducing an amount of operation performed in the target block, and/or adjusting a size of the target block. For example, when the target block is a CNN block, a plurality of CNN blocks having different filter sizes may correspond to candidate blocks corresponding to the target block.

The neural architecture search method may include an operation of training the candidate blocks corresponding to the target block to replace the target block 111, 112 with one of the candidate blocks 120. The operation of training the candidate blocks may be performed for each target block.

Training of candidate blocks corresponding to one target block may be performed for each of the candidate blocks. When a plurality of target blocks is present, an operation of training candidate blocks corresponding to each of the target blocks may be performed in parallel by a plurality of processors or performed sequentially by a single processor. In addition, the training of the candidate blocks corresponding to one target block may be performed in parallel by a plurality of processor and may also be performed sequentially by a single processor.

A processor that trains the candidate blocks corresponding to the target block may acquire candidate blocks to be trained through an input of a user or acquire the candidate blocks by accessing a memory in which preset candidate blocks are stored to correspond to the corresponding target block. The training may be performed on all or part of the candidate blocks acquired to correspond to the target block. Some of the acquired candidate blocks may be excluded from a target to be trained according to a set criterion and thus, may not be trained. For example, when an architecture parameter of a candidate block updated in a process of training does not satisfy a predetermined criterion, the candidate block may be excluded from the target to be trained. Also, when a network size of a candidate block does not satisfy a predetermined criterion, the candidate block may be excluded from the target to be trained. In other words, the processor that trains the candidate blocks corresponding to the target block may determine whether to train each of the candidate blocks corresponding to the target block and may perform the training on a candidate block determined as the target to be trained.

The operation of training the candidate blocks may include an operation of training weights and architecture parameters of the candidate parameters corresponding to the target block. The candidate block may be trained based on arbitrary input data and output data of the target block generated in response to the input data. In addition, the candidate block may be trained based on, or to consider, a condition such as performance in hardware performed in the candidate block.

The architecture parameter of the candidate block may correspond to a parameter updated dependently on a loss function in a training process of the candidate block. As described below, the architecture parameter of the candidate block may be used both as a criterion for determining whether the candidate block is to be trained and a criterion for selecting the trained candidate block to replace the target block.

An operation of training a candidate block in a neural architecture search method will be described below with reference to FIGS. 3 and 4.

When the training of the candidate blocks corresponding to a target block is completed, the target block may be replaced by one of the corresponding candidate blocks. A candidate block to replace the target block may be determined based on an architecture parameter value of the candidate block. When the training of the candidate blocks is complete, a candidate block having a greatest architecture parameter value may be selected from the candidate blocks as a block to replace the target block. In other words, an operation of replacing the target block may include an operation of selecting a block having a greatest architecture parameter from the candidate blocks and an operation of replacing the target block with the selected candidate block.

Referring to FIG. 1, a candidate block including an operation set 1 having a greatest architecture parameter (e.g., having an architecture parameter of "0.7" that is a greatest architecture parameter among architecture parameters "0.7," "0.3," "0.5," and "0.2" of respective operation sets 1 through 4) may be selected from the candidate blocks 120 to replace the target block in the pre-trained neural network 110. When a pre-trained neural network operates, an input of the target block may be input to the selected candidate block, so that an output of the selected candidate block may be processed as an output of the target block.

When it is determined that an operation performed in the trained candidate blocks does not result in a sufficient accuracy and/or performance compared to the target block, the target block may remain in the pre-trained neural network 110 without being replaced by another candidate block. Performance of the operation performed in the candidate block may be estimated based on the architecture parameter of the candidate block. In some cases, an architecture parameter may also be included in the target block. In such cases, whether the target block is to be replaced may be determined by comparing the architecture parameter of the target block and the architecture parameter of the candidate block.

Figure 3:
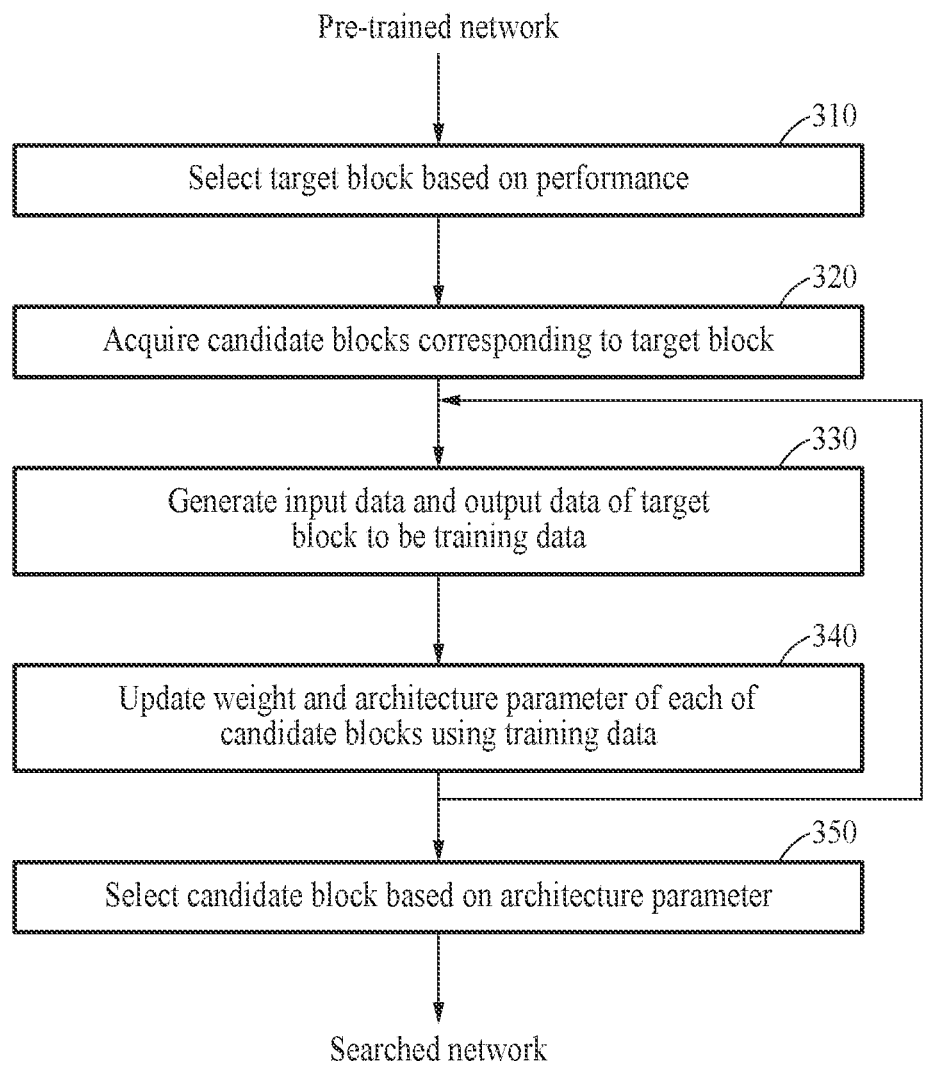
FIG. 3 illustrates an example of a neural architecture search method.

FIG. 3 illustrates an example of a neural architecture search method.

Referring to FIG. 3, a neural architecture search method may include operation 310 of selecting, in response to a pre-trained neural network being input, a target block based on performance of blocks included in the network, operation 320 of acquiring candidate blocks corresponding to the target block, operation 330 of generating input data and output data of the target block to be training data, operation 340 of updating a weight and an architecture parameter of each of the candidate blocks using the training data, operation 350 of selecting a candidate block based on the architecture parameters, and an operation of outputting a searched network in which the target block is replaced by the selected candidate block.

The training of the candidate blocks corresponding to the target block may be performed by repeating a training iteration including operation 330 of generating input data and output data of the target block to be training data and operation 340 of updating a weight and an architecture parameter of each of the candidate blocks using the training data. The training iteration may be repeated a predetermined number of times and/or until a loss corresponding to each of the candidate blocks converges on a predetermined value (e.g., until the loss corresponding to each of the candidate blocks is less than or equal to the predetermined value).

To train the candidate blocks corresponding to the target block, a knowledge distillation scheme of learning using arbitrary input data and output data of the target block generated in response to the arbitrary input data (e.g., output data generated by inputting the arbitrary input data into the target block) may be used. In other words, training data of the candidate block corresponding to the target block may include the arbitrary input data and the output data of the target block generated in response to the input data. More specifically, the training data for training the candidate blocks corresponding to the target block may be generated using, as ground truth data, output data acquired by generating the arbitrary input data and inputting the generated arbitrary input data to a corresponding target block. The arbitrary input data may include, for example, a real number between 0 and 1 arbitrarily generated through random number generation. By performing the training using the arbitrary input data and the output data of the target block generated in response to the input data as the training data, the candidate blocks may be trained to output the same (or substantially similar) result as the target block with respect to the same input.

A processor that performs the training of the candidate blocks corresponding to the target block may generate the training data for each training iteration and remove the training data after the training of the candidate blocks based on the training data is completed. The training data may be generated when the training iteration is performed and removed after the training is completed, thereby reducing a use of memory required for the training.

The processor that performs the training of the candidate blocks corresponding to the target block may determine whether to train each of the candidate blocks based on an architecture parameter of a corresponding candidate block. For example, when an architecture parameter of a first candidate block is lower than a predetermined criterion (e.g., threshold), the first candidate block may be excluded from a target to be trained. The processor that performs the training of the candidate blocks may train a candidate block(s) determined as the target to be trained with a weight and an architecture parameter based on the training iteration. Whether to be trained may be determined for each of the candidate blocks based on the architecture parameter dependent on the loss function, thereby reducing an amount of operations required for training the candidate blocks. Also, a neural architecture search for optimizing a neural network structure may be performed by efficiently using computing resources.

Figure 4:
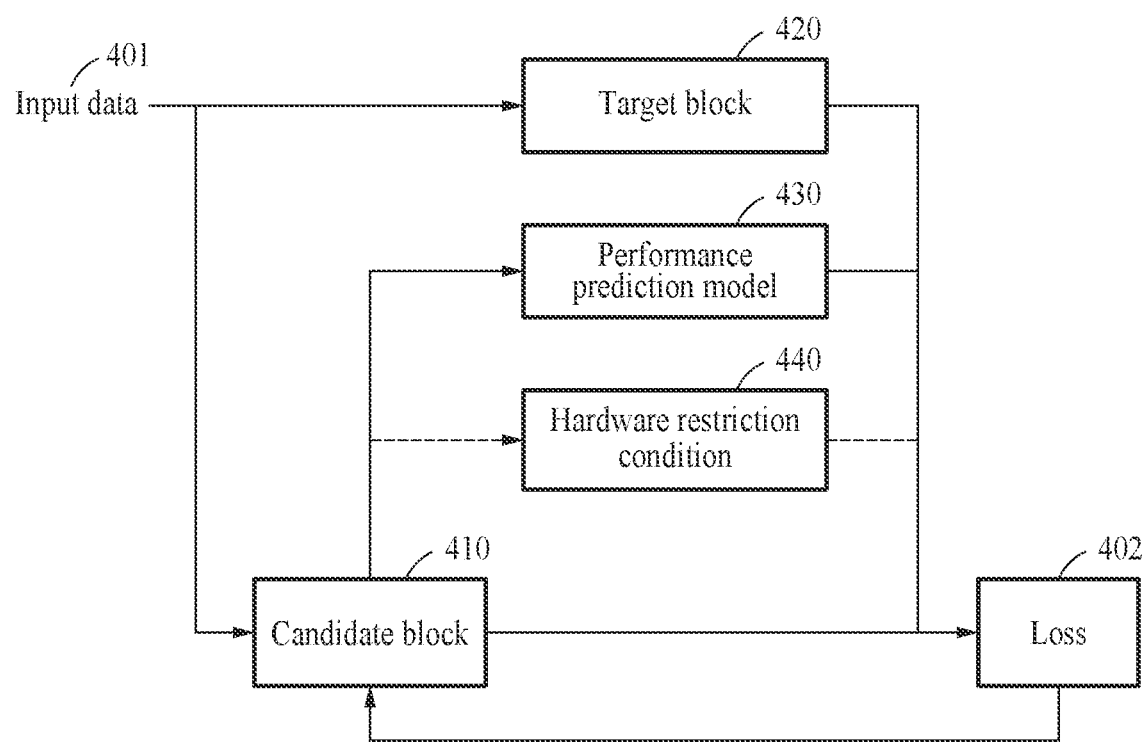
FIG. 4 illustrates an example of a method of training a candidate block corresponding to a target block.

FIG. 4 illustrates an example of a method of training a candidate block corresponding to a target block.

An operation of training candidate blocks corresponding to the target block may include an operation of generating, for each of the candidate blocks, a loss function based on a degree of matching between output data of a corresponding candidate block and output data of the target block generated in response to the same input data and performance of the corresponding candidate block; and an operation of training a weight and an architecture parameter of the corresponding candidate block based on the loss function.

A loss function for training each of the candidate blocks corresponding to the target block may be determined based on a degree of matching between output data of the candidate block and output data of the target block and performance of an operation performed in the candidate block.

Referring to FIG. 4, a loss function 402 for training a candidate block 410 corresponding to a target block 420 may be determined based on a degree of matching between output data of the candidate block 410 and output data of the target block 420 (generated based on the same input data 401) and performance of the candidate block 410.

The degree of matching between the output data of the candidate block 410 and the output data of the target block 420 may be a degree to which output data of the candidate block and output data of the target block generated in response to the same input data 401 match. The degree of matching may be included in the loss function to train the candidate block to output the same result as the target block.

The performance of the candidate block 410 may be determined based on an execution speed of the candidate block, a number of calculations, and/or a size of a neural network. The performance of the candidate block 410 may be determined by measuring performance of an operation of an actual candidate block or estimating the performance using a learning model and the like. A value indicating the performance of the candidate block may be included in the loss function to train the candidate block such that an architecture parameter value defined to be dependent on the loss function is updated based on the degree of matching between the output data of the target block and the output data of the candidate block and the performance of the candidate block.

The performance of the candidate block 410 may be measured or estimated using a performance prediction model 430. To acquire the performance of the candidate block, the performance prediction model may include a lookup table in which a measurement value of performance in actual hardware of operations performed in the candidate block is recoded, a prediction model in which performance of the operations is learned by deep learning, and/or a simulator that simulates performance in the hardware of the operations.

For example, when the target block is an i-th block of a pre-trained neural network and a candidate block to be trained is a j-th candidate block, a loss function $L_{ij}$ corresponding to the candidate block may be defined as shown in Equation 1 below, for example.

Equation 1:

$$\mathcal{L}_{ij}(A_{ij}, h_{ij}; X_i, Y_i) = f(Y_i - h_{ij}(X_i)) + \lambda \cdot PPM(A_{ij})$$

In Equation 1, $A_{ij}$ denotes a structure of a candidate block j corresponding to a target block i, $h_{ij}$ denotes an operation performed in the candidate block j corresponding to the target block i, $X_i$ denotes arbitrary input data, $Y_i$ denotes output data of the target block i, f denotes a cost function, $\lambda$ denotes a balance constant, and PPM corresponds to a function that output a value indicating the performance.

The balance constant $\lambda$ may function to adjust, in the loss function, a proportion occupied by the performance of the candidate block and a matching degree of data output from the target block and the candidate block. Also, depending on a definition of the performance according to an embodiment, it can be inferred that the performance is better as a value representing the performance decreases or that the performance is better as a value representing the performance increases. Thus, the value may be set to a positive or negative number depending on an embodiment.

As described above, the architecture parameter of the candidate block may be a parameter updated dependent on the loss function and may correspond to a value to which the degree of matching between the output data of the candidate block and the output data of the target block and the performance of the operation performed in the candidate block are applied. A processor that performs a neural architecture search may define, for each of the candidate blocks, an architecture parameter dependent on the loss, select a candidate block to be trained from the candidate blocks based on the architecture parameter when training, select a candidate block from the candidate blocks based on the architecture parameter after the training of the candidate blocks is completed, and replace the target block with the selected candidate block.

Figure 5:
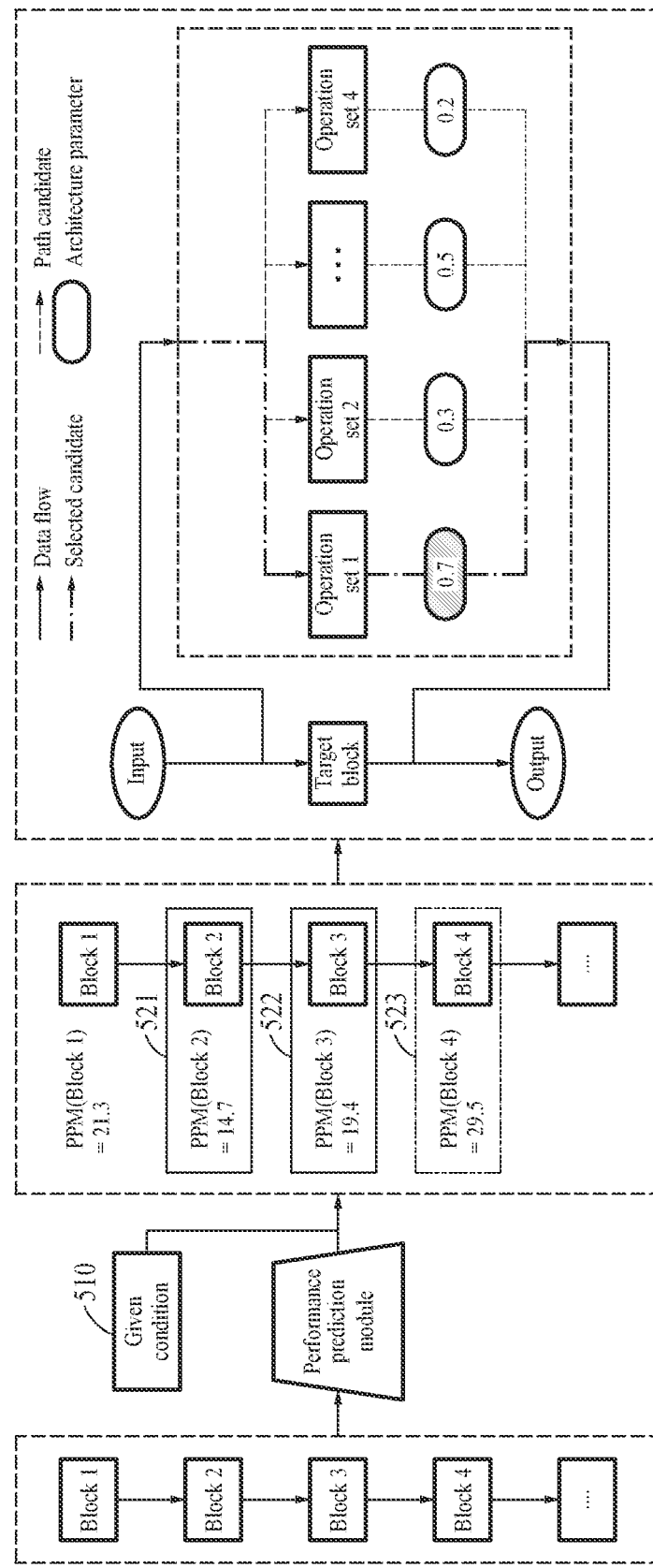
FIG. 5 illustrates an example of a method of searching for a neural architecture further based on a condition other than performance of an operation.

FIG. 5 illustrates an example of a method of searching for a neural architecture further based on a condition other than performance of an operation.

Referring to FIG. 5, in an operation of selecting a target block, an operation of selecting at least one target block from blocks by adding a condition other than a performance condition may be further included. By reflecting the condition other than the performance condition in a target block selecting operation and a candidate block training operation, a neural architecture search method may apply even when performance of an operation performed in a block may not be estimated or when a neural network architecture is to be optimized in terms of a condition other than performance in hardware.

Here, the condition other than the performance may include a hardware restriction condition. The condition other than the performance condition may include various conditions. The following description will be given of an example in which the condition other than the performance condition is the hardware restriction condition.

The hardware restriction condition may be set based on hardware in which a neural network is executed. The hardware restriction condition may include, for example, a type of an operation supported in the hardware in which the neural network is executed, a limitation on a number of layers of the entire network, an acceptable weight range, an amount of memory, and/or whether to optimize an operation.

When the hardware restriction condition is further added in the target block selecting operation, a block 523 that does not satisfy the hardware restriction condition may be selected as a target block based on performance, for example, based on blocks 521 and 522 requiring a performance improvement and a hardware restriction condition 510. Although FIG. 5 illustrates a case in which a block that does not satisfy the performance condition or does not satisfy the hardware restriction condition is selected as the target block, in some cases, a block that does not match the performance condition and does not match the hardware condition may be selected as the target block.

The hardware restriction condition may be reflected in an operation of training candidate blocks corresponding to the target block. Referring to FIG. 4, a loss function 402 for training the candidate block 410 corresponding to the target block may be determined based on a degree of matching between output data of the candidate block 410 and output data of the target block 420, performance of the candidate block 410 according to the performance prediction model 430, and a hardware restriction condition 440. The operation of training the candidate blocks corresponding to the target block may include an operation of generating, for each of the candidate blocks, a loss function based on a degree of matching between output data of a corresponding candidate block and output data of the target block generated in response to the same input data, performance of the corresponding candidate block, and the hardware restriction condition and an operation of training a weight and an architecture parameter of the corresponding candidate block based on the loss function.

For example, when the target block is an i-th block of a pre-trained neural network and a candidate block to be trained is a j-th candidate block, a loss function for training the candidate block reflecting the hardware restriction condition may be defined as shown in Equation 2 below, for example.

Equation 2:

$$\mathcal{L}_{ij}(A_{ij}, h_{ij}; X_i, Y_i) = \{f(Y_i - h_{ij}(X_i)) + \lambda \cdot PPM(A_{ij})\} \cdot Con(A_{ij})$$

In Equation 2, $A_{ij}$ denotes a structure of a candidate block j corresponding to a target block i, $h_{ij}$ denotes an operation performed in the candidate block j corresponding to the target block i, $X_i$ denotes arbitrary input data, $Y_i$ denotes output data of the target block i, f denotes a cost function, $\lambda$ denotes a balance constant, PPM denotes performance, and Con corresponds to a function related to the hardware restriction condition.

Con may output various values based on the hardware restriction condition. For example, in a case in which a type of an operation supported in the hardware is designated by the hardware restriction condition, a block including an operation that is not supported in the hardware may output "0" and a block including the operation supported in the hardware may output "1."

The neural architecture search method may be used to optimize a neural network architecture based on the hardware in which the neural network is executed. The hardware in which the neural network is executed may correspond to hardware including a learnable processor such as a central processing unit (CPU), a graphics processing unit (GPU), a neural processing unit/neural processor (NPU), and the like. By setting the hardware restriction condition based on the hardware in which the neural network is executed, the neural network architecture may be optimized based on the hardware. For example, when the neural architecture search method is used to optimize a neural network architecture in the NPU, an operation supported in the NPU and a memory capacity of the NPU may be set as the hardware restriction condition.

In terms of hardware in which a predetermined neural network is executed, a considerable period of time may be taken from hardware designing to actual product implementation. For this reason, an operation in a form that has not been used in the neural network at the time of designing the hardware may need to be supported after the hardware is implemented as the actual product. In this case, the operation that is not supported in the hardware may be set as the hardware restriction condition so that the neural architecture search method for replacing the target block is applied.

In some cases, when a user is to optimize a pre-trained neural network based on specific hardware, training data may be absent or hardware resources required for training may not be sufficiently obtained. In such cases, the neural network search method may be used to generate input and output data of a target block to be optimized to be training data or set a memory capacity of the hardware as the hardware restriction condition, thereby training candidate blocks corresponding to the target block.

Figure 6:
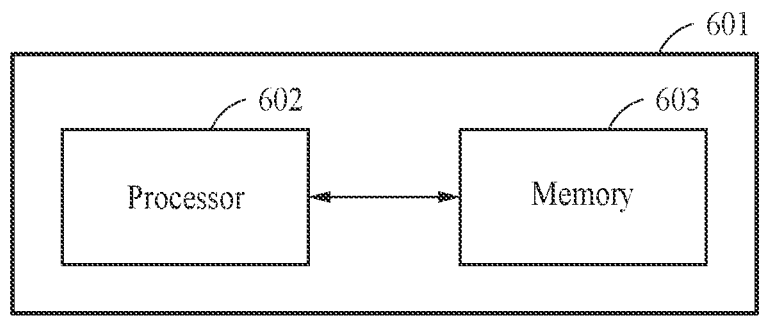
FIG. 6 illustrates an example of a configuration of an apparatus.

FIG. 6 illustrates an example of a configuration of an apparatus.

Referring to FIG. 6, an apparatus 601 may include a processor 602 (e.g., one or more processors) and a memory 603.

The apparatus 601 may be an apparatus for performing the neural architecture search methods described above. The apparatus 601 may include a computer, a terminal, an SDK, and other devices including a learnable processor. The processor 602 may perform at least one of the methods described with reference to FIGS. 1 through 5. The processor 602 may be a learnable processor and may include, for example, NPU, GPU, and CPU. The memory 603 may store information associated with the neural architecture search method or store a program in which the neural architecture search method is implemented. The memory 603 may be a volatile memory or a nonvolatile memory.

The processor 602 may execute a program and control the apparatus 601. Codes of the program executed by the processor 602 may be stored in the memory 603. The apparatus 601 may be connected to an external device (e.g., a personal computer or a network) through an input and output device (not shown) and perform data exchange.

The performance prediction modules, apparatuses, processors, memories, performance prediction module 210, apparatus 601, processor 602, memory 603, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented neural architecture search method, comprising:
    acquiring performance of neural network blocks included in a pre-trained neural network;
    selecting at least one target block for performance improvement from the neural network blocks;
    training weights and architecture parameters of candidate blocks corresponding to the target block based on arbitrary input data and output data of the target block generated based on the input data;
    selecting one of the candidate blocks based on the trained architecture parameters of each of the candidate blocks; and
    updating the pre-trained neural network by replacing the target block in the pre-trained neural network with the selected one of the candidate blocks based on the trained architecture parameters,
    wherein the architecture parameters of each of the candidate blocks are updated, during a training process based on loss functions of each of the candidate blocks, and
    wherein the loss functions of each of the candidate blocks are determined based on degrees of matching between output data of each of the candidate blocks and the output data of the target block and values indicating performance of each of the candidate blocks.

2. The method of claim 1, wherein the training comprises, for each of the corresponding candidate blocks:
    generating a loss function based on a degree of matching between output data of the corresponding candidate block and the output data of the target block and performance of the corresponding candidate block, wherein the output data of the corresponding candidate block and the output data of the target block are generated based on the same input data; and
    training a weight and an architecture parameter of the corresponding candidate block based on the loss function.

3. The method of claim 1, wherein the training comprises, for each of the corresponding candidate blocks:
    determining whether the corresponding candidate block is a target to be trained based on an architecture parameter of the corresponding candidate block; and
    training the corresponding candidate block in response to the corresponding candidate block being determined as the target to be trained.

4. The method of claim 3, wherein the determining comprises determining the corresponding candidate block is the target to be trained in response to the architecture parameter of the corresponding candidate block being greater than or equal to a predetermined threshold.

5. The method of claim 1, wherein the acquiring of the performance of the neural network blocks comprises:
    determining the performance of the neural network blocks based on measurement values of performance in actual hardware of operations of the neural network blocks.

6. The method of claim 1, wherein the acquiring of the performance of the neural network blocks comprises:
    estimating the performance of the neural network blocks based on a prediction model in which performance in hardware of operations of the neural network blocks is learned.

7. The method of claim 1, wherein the acquiring of the performance of the neural network blocks comprises:
    estimating the performance of the neural network blocks based on a simulation of performance in hardware of operations of the neural network blocks.

8. The method of claim 1, wherein the selecting of the target block comprises either one or both of:
    selecting at least one of the neural network blocks as the target block in an ascending order of the performance of the neural network blocks; and
    comparing the performance of the neural network blocks to a threshold and selecting at least one of the neural network blocks having performance lower than the threshold as the target block.

9. The method of claim 1, wherein the training comprises:
    generating the input data and generating the output data by inputting the input data to the target block as training data;
    training at least one of the candidate blocks based on the training data; and
    removing the training data in response to completion of the training performed based on the training data.

10. The method of claim 1, wherein the training comprises:
    acquiring, as the candidate blocks, candidate blocks having an input dimension and an output dimension which are the same as that of the target block.

11. The method of claim 1, wherein the replacing of the target block comprises:
    selecting one of the candidate blocks having a greatest architecture parameter from the candidate blocks; and
    replacing the target block with the selected candidate block.

12. The method of claim 1, wherein the selecting of the target block further comprises:
    selecting the target block from the neural network blocks based on a hardware restriction condition.

13. The method of claim 12, wherein the training comprises, for each of the corresponding candidate blocks:
    generating a loss function based on a degree of matching between output data of the corresponding candidate block and the output data of the target block, performance of the corresponding candidate block, and the hardware restriction condition, wherein the output data of the corresponding candidate block and the output data of the target block are generated based on the same input data; and
    training a weight and an architecture parameter of the corresponding candidate block based on the loss function.

14. The method of claim 12, wherein the hardware restriction condition corresponds to a neural network operation type and a neural network size supported by hardware configured to implement the neural network.

15. The method of claim 12, wherein the selecting of the target block based on the hardware restriction condition comprises selecting the target block in response to the target block not satisfying the hardware restriction condition.

16. The method of claim 1, wherein each of the neural network blocks comprise at least one layer of the pre-trained neural network.

17. The method of claim 1, wherein each of the candidate blocks comprise at least one layer in which a predetermined operation of the trained neural network is performed and have an input dimension and an output dimension which are the same as that of the target block.

18. The method of claim 1, wherein the performance is determined based any one or any combination of an execution speed of the neural network blocks in hardware, a number of calculations performed by the neural network blocks, and a size of the neural network.

19. A non-transitory computer-readable storage medium storing instructions that, when executed by one or more processors, configure the one or more processors to perform the method of claim 1.

20. A neural architecture search apparatus comprising:
one or more processors configured to:
    acquire performance of neural network blocks included in a pre-trained neural network;
    select at least one target block for performance improvement from the neural network blocks;
    train weights and architecture parameters of candidate blocks corresponding to the target block based on arbitrary input data and output data of the target block generated based on the input data;
    select one of the candidate blocks based on the trained architecture parameters of each of the candidate blocks; and
    update the pre-trained neural network by replacing the target block in the pre-trained neural network with the selected one of the candidate blocks based on the trained architecture parameters,
    wherein the architecture parameters of each of the candidate blocks are updated, during a training process based on loss functions of each of the candidate blocks, and
    wherein the loss functions of each of the candidate blocks are determined based on degrees of matching between output data of each of the candidate blocks and the output data of the target block and values indicating performance of each of the candidate blocks.

21. The apparatus of claim 20, wherein, for the training, the one or more processors are configured to, for each of the candidate blocks:
    generate a loss function based on a degree of matching between output data of the corresponding candidate block and the output data of the target block and performance of the corresponding candidate block, wherein the output data of the corresponding candidate block and the output data of the target block are generated based on the same input data; and
    train a weight and an architecture parameter of the corresponding candidate block based on the loss function.

22. The apparatus of claim 20, wherein, for the training, the one or more processors are configured to, for each of the corresponding candidate blocks:
    determine whether the corresponding candidate block is a target to be trained based on an architecture parameter of the corresponding candidate block; and
    train the corresponding candidate block in response to the corresponding candidate block being determined as the target to be trained.

23. The apparatus of claim 20, wherein, for the training, the one or more processors are configured to:
    generate, as training data, the input data and the output data of the target block;
    train at least one of the candidate blocks based on the training data; and
    remove the training data in response to completion of the training performed based on the training data.

24. The apparatus of claim 20, wherein, for the acquiring of the performance of the neural network blocks, the one or more processors are configured to perform any one or any combination of:
    determining the performance of the neural network blocks based on measurement values of performance in actual hardware of operations of the neural network blocks;
    estimating the performance of the neural network blocks based on a prediction model in which the performance in the hardware of the operations of the neural network blocks is learned; and
    estimating the performance of the neural network blocks based on a simulation of the performance in the hardware of the operations of the neural network blocks.

25. The apparatus of claim 20, wherein, for the training, the one or more processors are configured to acquire, as the candidate blocks, candidate blocks having an input dimension and an output dimension which are the same as that of the target block.

26. The apparatus of claim 20, wherein, for the selecting of the target block, the one or more processors are configured to select the target block from the neural network blocks based on a hardware restriction condition.

27. The apparatus of claim 26, wherein, for the training, the one or more processors are configured to, for each of the corresponding candidate blocks:
    generate a loss function based on a degree of matching between output data of the corresponding candidate block and the output data of the target block, performance of the corresponding candidate block, and the hardware restriction condition, wherein the output data of the corresponding candidate block and the output data of the target block are generated based on the same input data; and
    train a weight and an architecture parameter of the corresponding candidate block based on the loss function.

28. A processor-implemented neural architecture search method, comprising:
    selecting a target block from neural network blocks included in a pre-trained neural network, based on performance of the neural network blocks;
    selecting candidate blocks based on architecture parameters of the candidate blocks;
    training the architecture parameters of the selected candidate blocks based on arbitrary input data and output data generated by inputting the input data to the target block; and
    selecting one of the candidate blocks based on the trained architecture parameters of each of the candidate blocks; and
    updating the pre-trained neural network by replacing the target block in the pre-trained neural network with the selected one of the candidate blocks selected based on the trained architecture parameters,
    wherein the architecture parameters of each of the candidate blocks are updated, during a training process based on loss functions of each of the candidate blocks, and
    wherein the loss functions of each of the candidate blocks are determined based on degrees of matching between output data of each of the candidate blocks and the output data of the target block and values indicating performance of each of the candidate blocks.

29. The method of claim 28, wherein data used to train the pre-trained neural network does not include the arbitrary input data and the output data of the target block.

* * * * *